(12) United States Patent
Krohn et al.

(10) Patent No.: US 6,876,297 B2
(45) Date of Patent: Apr. 5, 2005

(54) VEHICLE PROTECTIVE COVER INCLUDING AN ALARM UNIT

(75) Inventors: Kristopher M. Krohn, Sheboygan, WI (US); Kenneth R. Schweda, Manitowoc, WI (US)

(73) Assignee: Dowco, Inc., Manitowoc, WI (US)

( * ) Notice: Subject to any disclaimer, the term of this patent is extended or adjusted under 35 U.S.C. 154(b) by 41 days.

(21) Appl. No.: 10/367,483

(22) Filed: Feb. 14, 2003

(65) Prior Publication Data

US 2003/0156018 A1 Aug. 21, 2003

Related U.S. Application Data

(60) Provisional application No. 60/357,231, filed on Feb. 15, 2002.

(51) Int. Cl.[7] .................................................. B62J 3/00
(52) U.S. Cl. .................... 340/427; 340/426.1; 340/432; 340/545.6; 340/568.2
(58) Field of Search .......................... 340/432, 426.13, 340/426.1, 427, 429, 545.6, 568.2, 572.8

(56) References Cited

U.S. PATENT DOCUMENTS

| | | |
|---|---|---|
| 4,222,032 A | 9/1980 | Speer |
| 4,253,084 A | 2/1981 | Topputo |
| 4,274,077 A | 6/1981 | Feiger |
| 4,698,615 A | 10/1987 | Wilber |
| 4,821,025 A | 4/1989 | Ross, Sr. |
| 5,242,205 A | 9/1993 | Garner |
| 5,572,186 A | 11/1996 | Traxler et al. |
| 5,686,909 A | 11/1997 | Steinhauser |
| 5,764,144 A | 6/1998 | Falkiner et al. |
| 6,028,507 A | 2/2000 | Banks et al. |
| 6,040,764 A | 3/2000 | Crisci |

OTHER PUBLICATIONS

Cycle Outfitter.com Website; Dowco Guardian Motorcycle Cover (500 to 1100cc Bikes with Fairing & Bags), p. 1.

*Primary Examiner*—Brent A. Swarthout
(74) *Attorney, Agent, or Firm*—Reinhart Boerner Van Deuren s.c.

(57) ABSTRACT

A vehicle security system includes a protective cover incorporating a battery operated alarm unit contained within a pocket that is attached to the inner surface of the cover. A cable contained within the cover removably connects a switch actuating plunger of the alarm unit to the vehicle for operating a switch to activate the alarm unit, producing an audible alarm in the event an intruder attempts to remove the cover from the vehicle.

28 Claims, 2 Drawing Sheets

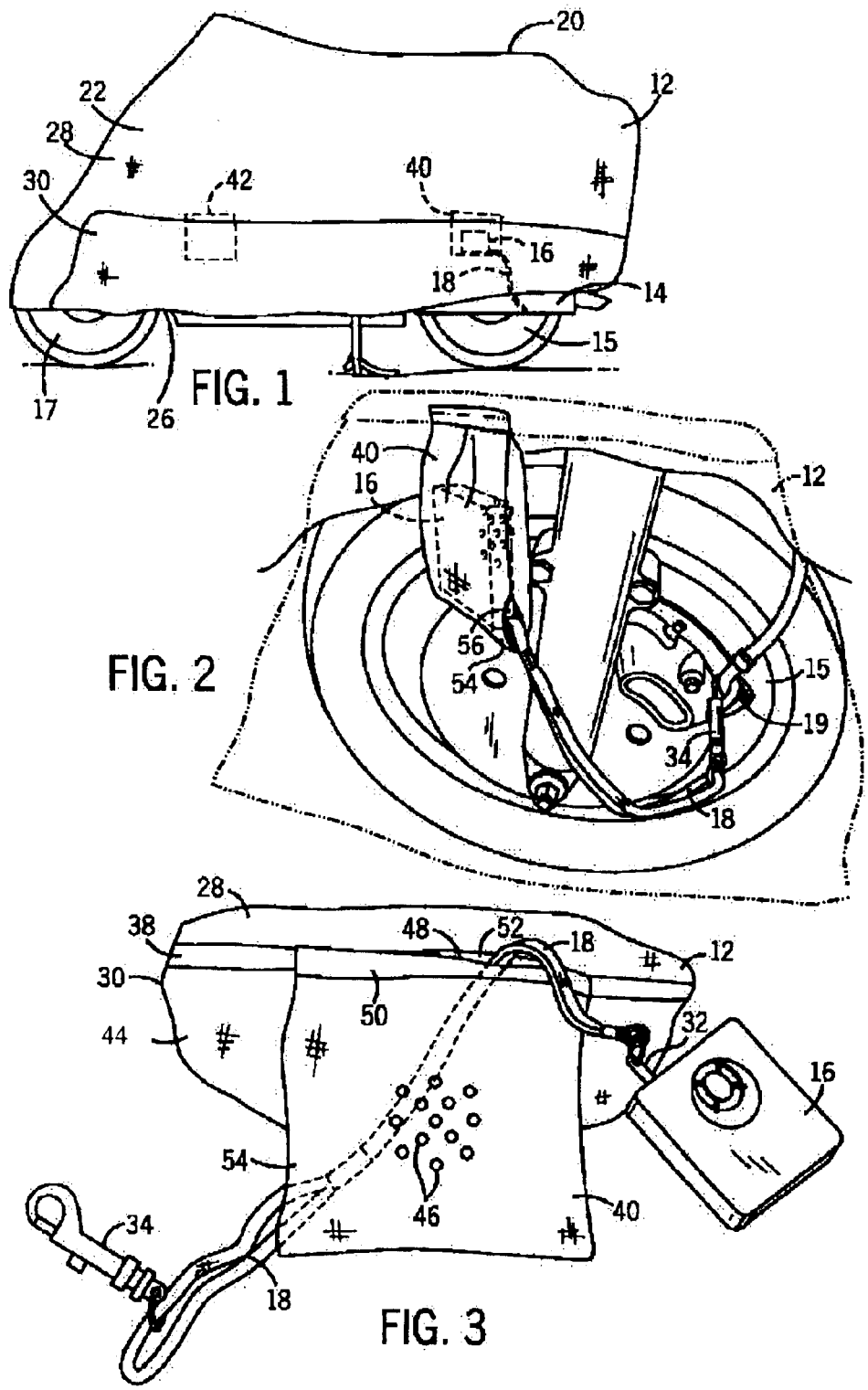

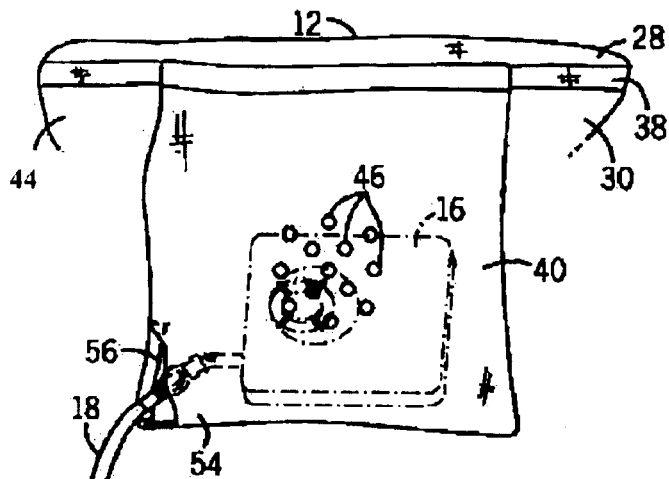
FIG. 4
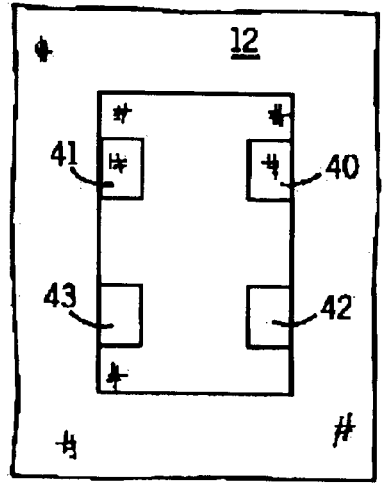
FIG. 5
FIG. 6
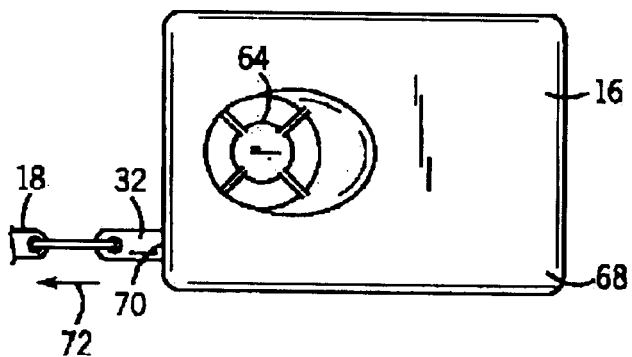
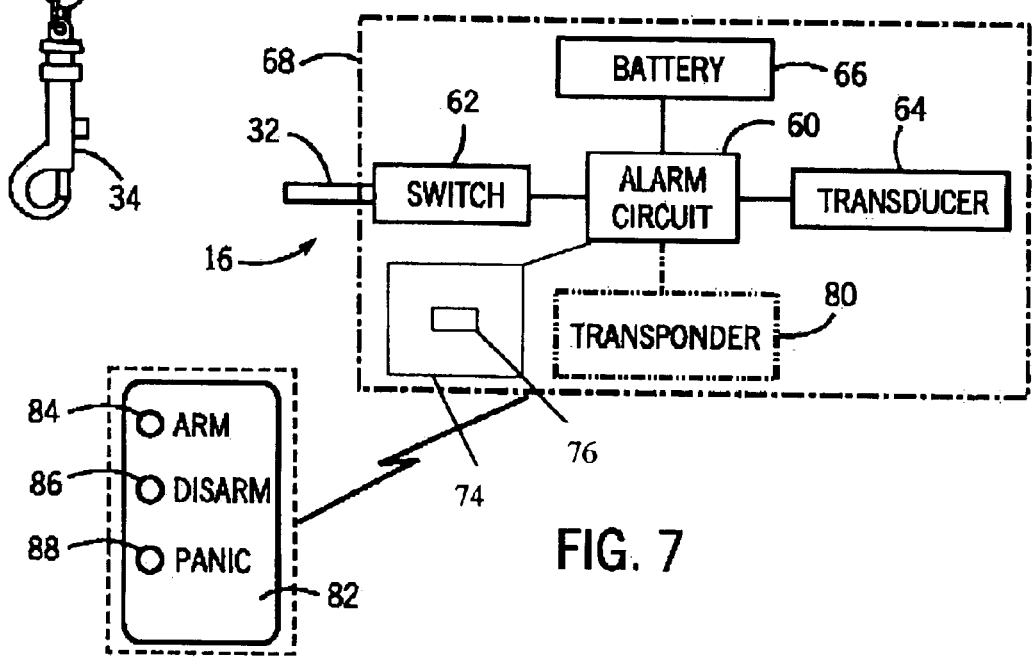
FIG. 7

VEHICLE PROTECTIVE COVER INCLUDING AN ALARM UNIT

CROSS-REFERENCE TO RELATED APPLICATION

This application claims priority of U.S. provisional application No. 60/357,231, which was filed on Feb. 15, 2002.

BACKGROUND OF THE INVENTION

This invention relates to vehicle security systems, and more particularly, to a vehicle security system including a protective cover incorporating an alarm unit.

Many vehicle owners use a protective cover to protect their vehicle when the vehicle is not being used and as a deterrent to theft of the vehicle and its contents. Protective covers can be made from canvas or other materials and may cover substantially the entire vehicle when the vehicle is an automobile or motorcycle, or only an exposed area of the vehicle when the vehicle is a boat. Protective covers typically are held in place with an elastic shock cord that extends along the periphery of the cover for automobile or motorcycle covers, or by snaps for boat covers. Consequently, protective covers do little to deter an intruder from removing the protective cover and taking the cover or the vehicle or its contents.

Accordingly, protective covers that include a security system have been proposed for producing an alarm indication to alert the owner of an intrusion, to scare a would-be thief away from the vehicle, and/or to alert others in the area that an attempted break-in is occurring. Many arrangements for detecting the movement or removal of a protective cover from a vehicle have been developed in the prior art. Typically, these systems employ switches that are attached to the vehicle and operated in response to movement or removal of the protective cover.

U.S. Pat. No. 4,698,615, issued to Wilber, discloses an alarm system for detecting movement of a protective cover for a boat. The alarm system includes a plurality of spring-biased switches that are mounted within the boat. Each switch is held in an open condition by a split edge clamp member to which is attached a cord. The cord, in turn, is attached to the protective cover when the cover is deployed over the boat. When the switch has been coupled to the protective cover by the cord, moving the protective cover pulls on the cord which, in turn, pulls the clamp member from the spring-biased switch. The switch then closes and activates an alarm device. This alarm system requires attachment of a plurality of brackets to the boat. Also, the alarm system requires a wire loop that extends around the periphery of the boat and all of the switches must be connected to this loop. Deploying the protective cover requires the user to reach beneath the cover and secure each cord to the cover.

U.S. Pat. No. 4,821,025, issued to Ross, Sr., discloses a vehicle cover alarm apparatus including a spring-biased switch for operating an alarm in response to removal of a protective cover from a vehicle. The switch is maintained in the open condition by a cable which extends through a hole in the side of the vehicle and is removably attached by a clip to the deployed protective cover on the outside of the vehicle. Removing the cover releases the clip, allowing the spring-biased switch to activate an alarm device. Because the switch is mounted on the inside of the vehicle, an undesirable hole must be drilled through the vehicle for the cable to pass through. In addition, this alarm apparatus requires attachment of brackets to the vehicle. Moreover, this alarm apparatus is only capable of being used with vehicles which already have an alarm system.

SUMMARY OF THE INVENTION

The present invention provides a protective vehicle cover and vehicle cover security system. The protective vehicle cover and vehicle cover security system includes a protective cover having an inner surface and an outer surface and which is adapted to cover substantially all portions of a vehicle and at least one alarm unit removably affixed to said protective cover. An actuator cable has a first end removably coupled to the alarm unit and a second end removably coupled to the vehicle with the actuator cable untensioned. The alarm unit is triggered upon tensioning of the actuator cable by movement of the protective cover relative to the vehicle.

In one embodiment, the alarm unit is a battery-operated alarm unit that is attached to the inner surface of the cover. The actuator is contained within the cover and removably couples a switch actuator of the alarm unit to the vehicle for operating a switch to activate the alarm unit producing an audible alarm. In an application for protecting a motorcycle, the cable is removably connected to a fixed portion of the motorcycle, and the alarm unit is contained within a pocket on the inner surface of the protective cover in the proximity of the point of attachment to motorcycle.

In accordance with another aspect of the invention, there is provided a method of protecting a vehicle. The method includes the steps of providing a protective cover, said protective cover adapted to cover substantially all portions of a vehicle; removably affixing the alarm unit to the protective cover; positioning the protective cover over substantially all portions of the vehicle; and arming the alarm unit by coupling an actuator of the alarm unit to the vehicle by an actuator cable with the actuator cable untensioned, wherein the alarm unit is triggered upon movement of the protective cover relative to the vehicle.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a side view of a motorcycle including a security system including a protective cover incorporating an alarm unit in accordance with the invention;

FIG. 2 is an enlarged view of a wheel of the motorcycle shown in FIG. 1 and showing the connection of the distal end of an actuator cable of the alarm unit to a wheel of the motorcycle;

FIG. 3 is a fragmentary view of the inside of the protective cover and showing the alarm unit prior to being inserted into a pocket on an inner surface of the protective cover;

FIG. 4 is a view similar to that of FIG. 3 with the alarm unit contained within the pocket and with the pocket shown partially broken away to show the cable extending out of the pocket;

FIG. 5 is a view of the inside of the protective cover, showing a plurality of pockets for receiving one or more alarm units;

FIG. 6 is a plan view of the alarm unit; and

FIG. 7 is a block diagram of components of the alarm unit, and with a remote arming unit shown in phantom.

DETAILED DESCRIPTION OF THE PREFERRED EMBODIMENTS

Referring to FIG. 1, the security system of the present invention includes a protective cover 12 which is deployed on a vehicle 14, such as a motorcycle, and an alarm unit 16 which is located within the protective cover. In one embodiment, the alarm unit 16 can be a battery-operated unit that is removably fixed to the protective cover 12 and is coupled to the vehicle, such that the alarm unit is activated if the protective cover is moved or if an attempt is made to remove the protective cover from the vehicle. For purposes of illustration of the invention, the security system is described with reference to an application for a motorcycle. However, the protective cover can be configured in accordance with the application to fit around any vehicle, including automobiles, boats, and other types of cycles, including mopeds, scooters or bicycles, for example.

The protective cover 12 is shaped to fit over and around the motorcycle. The protective cover has a closed top portion 20, a left side 22, a right side (not shown) and an open bottom 26. The bottom 26 can be drawn around the lower portion of the motorcycle by an elastic shock cord passing through grommets (not shown) in the manner known in the art. In one embodiment, the protective cover 12 is made of two materials, with the upper portion, indicated by reference number 28, being of a weather proof material, and the lower portion, indicated by reference number 30, which is located where the protective cover 12 may come into contact with the engine while the engine is hot, being of a heat resistant material. In one preferred embodiment, the upper portion 28 of the protective cover 12 can be of a solution dried polyester material, and the lower portion 30 of the protective cover 12 can be of aluminized cotton material. However, the protective cover 12 can be a one-piece member of a single material, and can be of canvas, or other materials.

Referring also to FIGS. 2 and 3, the alarm unit 16 is located within the protective cover 12 and has an actuator that is coupled to the motorcycle. The alarm unit 16 includes a sonic transducer for emitting a loud tone when the alarm unit is activated. The alarm unit is located close to the point at which the alarm unit is coupled to the motorcycle 14. In one embodiment, the alarm unit 16 is a tether-switch type alarm apparatus. The alarm unit 16 can be coupled, by a cable 18, to any fixed or rigid part of the motorcycle, such as a wheel or a portion of the frame, for example. In one embodiment, the cable is removably attached to the motorcycle wheel that is closest to the location of the pocket containing the alarm unit 16. For the motorcycle illustrated in FIG. 1, the alarm unit 16 is located near the rear wheel 15 of the motorcycle, and accordingly, the cable 18 is attached to the rear wheel 15. While attachment to a motorcycle wheel is preferred because of its relatively low position on the motorcycle, it is apparent that the distal end of the cable can be attached to the motorcycle at other locations such that the distal end of the cable remains fixed in position and does not move when the protective cover 12 is moved relative to the motorcycle, allowing the cable to become sufficiently tensioned to activate the alarm. For other vehicles, the alarm unit attached to the protective cover 12 can be coupled to fixed or rigid part of the vehicle such that the distal end of the cable remains fixed in position when the protective cover 12 is moved relative to the vehicle.

The proximal end of the cable 18 is attached to a plunger actuator 32 extending out of the alarm unit. The distal end of the cable includes a removable connector 34, such as a swivel eye bolt snap, which permits removable attachment of the cable 18 to the wheel 15. The distal end of cable 18 can be attached to any portion of the wheel 15, (or to the front wheel 17). In one embodiment, the eye bolt snap 34 can be connected to any suitable surface of the motorcycle wheel 15, such as a lug 19, as shown in FIG. 2. The cable 18 can be braided to provide resistance against cutting by an individual attempting to compromise the alarm system or tampering with the motorcycle and/or the protective cover 12. The length of the cable 18 is such that the cable 18 can reach from the alarm unit 16 to the wheel 15 without being tensioned, and such that minimum movement of the protective cover 12 is required to set off an alarm.

Referring to FIGS. 1–4, the alarm unit 16 is contained within a pocket 40 which is attached to the inner surface 44 of the protective cover 12. One or more of the sides and/or bottom of the pocket 40 can be free from or attached to the protective cover 12. In one embodiment, the pocket 40 has an open upper end 48 which can be closed by a sealing edge 50 as shown, or by a flap which folds over the open upper end 48 of the pocket. The sealing edge 50, or flap, can be maintained in a closed position by hook and loop fastener, for example, indicated generally at 52, or by other means. This allows the pocket to be opened so that the alarm unit 16 can be removed from the protective cover 12 when protection is not required, to replace the battery, or for any other reason. Moreover, the pocket can be open at the top, or can have a different closure configuration, such as one that does not include a flap that folds over the open upper end 48 of the pocket. In addition, the pocket can comprise a single layer of material that is sewn to the protective cover 12 along both sides and the bottom to form the pocket, this embodiment being open at the top or having a closing flap, for example. One lower corner 54 of the pocket 40 has an opening 56 through which passes the cable 18 and/or the plunger actuator 32 to which the cable 18 is attached. However, the opening is small enough to prevent the alarm unit from being pulled through the opening.

In one embodiment, the pocket 40 is attached to the inner surface of the protective cover 12, preferably, by being sewn to the protective cover 12. The two materials 28 and 30, or components, which make up the protective cover 12, are sewn together at a seam 38. In one embodiment, the pocket 40 preferably is sewn to the cover at the seam 38, and can be attached to the cover at the same time that the two components of the cover are being sewn together. The pocket can include a plurality of perforations 46 to minimize attenuation of the audible signal by the material of the protective cover 12.

Referring also to the FIG. 5, in one embodiment, the protective cover 12 includes four pockets 40–43. Two of the pockets 40 and 41 are located near the rear wheel 15 of the motorcycle 14 on opposite sides of the motorcycle. The other two pockets 42 and 43 are located near the front wheel 17 of the motorcycle 14 on opposite sides of the motorcycle. The alarm unit 16 can be placed in any one of the pockets 40–43 and attached to the adjacent wheel. In a further embodiment, the alarm system can include four alarm units, one in each of the pockets 40–43.

Referring to FIGS. 6 and 7, the alarm unit 16 includes an alarm circuit 60, a switch 62, a transducer 64, and a battery 66. The components of the alarm unit are contained within a housing 68 which contains the components of the alarm unit. The spring loaded plunger actuator 32 extends through an opening 70 in the housing 68. The plunger actuator 32 is spring-biased to an unoperated position. Moving the plunger actuator 32 in the direction of the arrow 72, operates the switch 62, activating the alarm unit. The transducer 64 can produce an alarm at a 130 db sound level.

Referring to FIGS. 1, 2 and 4, to deploy the protective cover 12, the protective cover 12, unfolded and with the alarm unit 16 contained within one of the pockets, such as pocket 40, is arranged and positioned on the motorcycle 14. To arm the alarm unit 16, the owner or operator connects the plunger actuator 32 to the wheel 15, by connecting the distal end of the cable 18 to the wheel. The operator of the motorcycle lifts the protective cover 12 near the wheel 15 and positions the distal end of the cable 18 at the wheel 15 and attaches the eye bolt snap 34 to the lug 19 on the wheel. Thus, the proximal end of the cable 18 is fixed to the protective cover 12, by virtue of the alarm unit being contained within the pocket 40, and the distal end of the cable 18 is fixed to the motorcycle.

The cable 18 is sufficiently long to reach from the pocket to the mounting point on the motorcycle wheel, or other fixed point on the motorcycle, but the cable 18 does not have to be tensioned. For example, preferably there can be some slack in the cable 18, such that the protective cover 12 has to be moved about one-quarter inch to about an inch before the cable 18 is tensioned and further movement of the cover will result in the alarm being sounded. The amount of slack is related, for example, to the size of the motorcycle on which the cover is deployed. For a smaller motorcycle, the alarm unit will be located closer to the point of attachment, such as a wheel, and so there will be more slack in the cable 18.

After the operator attaches the eye bolt snap 34 onto the lug on the wheel 15, the operator releases the protective cover 12, allowing the protective cover 12 to fall around the lower portion of the motorcycle, as shown in FIG. 1. The protective cover 12 conceals the distal end of the cable 18 where it is connected to the wheel 15. Because the plunger actuator 32 is spring-biased, it resists activating the alarm for slight movement of the protective cover 12 unless the protective cover 12 is moved during an attempt to remove the cover.

When the operator subsequently wishes to remove the cover for any reason, such as to use the motorcycle, the operator carefully reaches under the protective cover 12 and disconnects the swivel eye bolt snap 34 from the wheel 15, thereby disconnecting the plunger actuator 32 from the motorcycle, effectively disarming the alarm unit, to allow the operator to remove the protective cover 12 without sounding the alarm.

However, an intruder attempting to remove the protective cover 12 will not be aware of the presence of the alarm unit 16 within the protective cover 12 or its connection to the motorcycle. Thus, typically an intruder will lift the protective cover 12, at any point along the extent of the motorcycle. As the protective cover 12 is moved relative to the motorcycle, the alarm unit 12 also is moved with the protective cover 12 relative to the motorcycle wheel 15 so that the plunger actuator 32 will be drawn out of the housing, in the direction of arrow 72 (FIG. 6) operating the switch 62 (FIG. 7). Referring also to FIG. 7, when the switch 62 is operated, the alarm circuit 60 is activated, causing the transducer 64 to produce an audible alarm. In one embodiment, the alarm circuit 60 can include a reset circuit 74, including a timer 76, that deactivates the alarm circuit after a preset interval of time. For example, the reset circuit 74 can cause the alarm circuit 60 to momentarily deactivate the alarm circuit after a given interval of time, perform a test to determine if the switch 62 has reopened, and if so, rearm the alarm circuit 60. However, if the switch 62 remains closed, the reset circuit 74 can reactivate the alarm circuit 60 so that the audible alarm is again sounded. By way of example, the duration of the time interval can be about two minutes. Alternatively, The alarm circuit 60 can include a manual reset mechanism so the alarm continues to sound until the alarm circuit is reset manually.

Referring to FIG. 7, in another embodiment, the alarm unit 16 can be armed remotely. This embodiment includes a transponder 80 mounted within the housing 68. The transponder 80 is activated by a signal transmitted by a portable hand-held remote unit 82 in response to operation by the operator of an "arm" switch 84 on the hand-held unit 82. The hand-held unit can be battery operated, for example. The transponder 80 responds to the arming signal to cause the alarm unit to the arm the alarm circuit 60. The alarm circuit 60 can cause the transponder 80 to return a signal to the hand-held unit 82 to flash an indicator, and/or activate the alarm transducer 64, or a separate transducer, momentarily, to produce a "chirping" sound, to indicate successful arming of the alarm unit 16. Likewise, for disarming the alarm unit, the operator can operate a "disarm" switch 86 on the hand-held unit 82 to cause the alarm circuit 60 to be deactivated. A response can be sent to the hand-held unit 82 to indicate that the alarm unit 16 has been deactivated. The hand-held control 82 can be used to activate the alarm unit 16 remotely by operating a panic switch 88 on the hand-held unit 82 to produce the audible alarm.

While preferred embodiments have been illustrated and described, it should be understood that changes and modifications can be made thereto without departing from the invention in its broadest aspects.

What is claimed is:

1. A protective vehicle cover and vehicle cover security system, comprising:

a protective cover having an inner surface and an outer surface, said protective cover adapted to cover substantially all portions of a vehicle;

at least one alarm unit removably affixed to said protective cover, said alarm unit including an actuator biased to a first position, said actuator movable to a second position to activate said alarm unit; and at least one actuator cable having a first end removably coupled to said actuator and a second end removably coupled to said vehicle, said actuator being in the first position when said actuator cable is untensioned, and said actuator being moved to the second position, triggering said alarm unit, in response to tensioning of said actuator cable caused by movement of said protective cover relative to said vehicle.

2. The protective vehicle cover and vehicle cover security system of claim 1, wherein said protective cover includes at least one pocket on said inner surface, said alarm unit adapted to be received in said pocket.

3. The protective vehicle cover and vehicle cover security system of claim 2, wherein said protective cover includes a plurality of pockets, said alarm unit adapted to be received in any one of said pockets.

4. The protective vehicle cover and vehicle cover security system of claim 2, wherein said pocket is defined independently of said inner surface of said protective cover, said pocket including a top portion, a bottom portion, and first and second side walls, and wherein at least a portion of said pocket is affixed to said inner surface of said protective cover so that said pocket hangs freely therefrom.

5. The protective vehicle cover and vehicle cover security system of claim 4, wherein said top portion of said pocket defines an opening for said pocket to allow said alarm unit to be inserted into said pocket, said top portion adapted to securely close said opening for maintaining said alarm unit in said pocket.

6. The protective vehicle cover and vehicle cover security system of claim 5, wherein said pocket further includes an aperture, said first end of said actuator cable extending into said pocket through said aperture and being removably coupled to said actuator of said alarm unit.

7. The protective vehicle cover and vehicle cover security system of claim 1, wherein said alarm unit further includes an alarm circuit, a switch and a transducer.

8. The protective vehicle cover and vehicle cover security system of claim 7, wherein said alarm circuit includes a reset circuit.

9. The protective vehicle cover and vehicle cover security system of claim 8, wherein said reset circuit includes a timer, said timer adapted to deactivate said alarm circuit after a preset interval of time.

10. The protective vehicle cover and vehicle cover security system of claim 7, wherein said alarm unit includes a transponder allowing remote arming of said alarm unit.

11. The protective vehicle cover and vehicle cover security system of claim 6, wherein said pocket includes at least one perforation to minimize attenuation of audible signals produced by said alarm unit when triggered.

12. A protective vehicle cover and vehicle cover security system, comprising:
   a flexible protective cover having an inner surface and an outer surface, said protective cover adapted to cover substantially all portions of a vehicle;
   at least one pocket on said inner surface of said protective cover, said pocket defined by a top portion, a bottom portion, and first and second side walls;
   at least one alarm unit removably contained within said pocket, said alarm unit including a plunger actuator extending therefrom, said plunger actuator biased to a first position, said plunger actuator movable to a second position to activate the alarm unit; and
   at least one actuator cable having a first end removably coupled to said plunger actuator of said alarm unit and a second end adapted to be removably coupled to said vehicle, said plunger actuator being in the first position when said actuator cable is untensioned, and said plunger actuator being moved to the second position, triggering said alarm unit in response to tensioning of said actuator cable caused by movement of said protective cover relative to said vehicle.

13. The protective vehicle cover and vehicle cover security system of claim 12, wherein said pocket is defined independently of said inner surface of said protective cover, and wherein at least a portion of said top portion of said pocket is affixed to said inner surface of said protective cover so that said pocket hangs freely therefrom.

14. The protective vehicle cover and vehicle cover security system of claim 13, wherein said top portion of said pocket defines an opening for said pocket to allow said alarm unit to be inserted into said pocket, said top portion adapted to securely close said opening for maintaining said alarm unit in said pocket.

15. The protective vehicle cover and vehicle cover security system of claim 14, wherein said pocket further includes an actuator cable aperture, said first end of said actuator cable extending into said pocket through said actuator cable aperture and being removably coupled to said plunger actuator.

16. The protective vehicle cover and vehicle cover security system of claim 15, wherein said alarm unit further includes an alarm circuit, a switch and a transducer.

17. The protective vehicle cover and vehicle cover security system of claim 16, wherein said alarm circuit includes a reset circuit.

18. The protective vehicle cover and vehicle cover security system of claim 17, wherein said reset circuit includes a timer, said timer adapted to deactivate said alarm circuit after a preset interval of time.

19. The protective vehicle cover and vehicle cover security system of claim 16, wherein said alarm unit includes a transponder allowing remote arming of said alarm unit.

20. The protective vehicle cover and vehicle cover security system of claim 15, wherein said pocket includes at least one perforation to minimize attenuation of audible signals produced by said alarm unit when triggered.

21. A method of protecting a vehicle comprising the steps of:
   providing a protective cover, said protective cover adapted to cover substantially all portions of a vehicle;
   removably affixing at least one alarm unit to said protective cover;
   positioning said protective cover over the vehicle covering substantially all portions of said vehicle;
   arming said alarm unit by coupling an actuator of the alarm unit to the vehicle by an actuator cable so that said actuator cable as coupled between said alarm unit and said vehicle is untensioned and the actuator is in a first position, said actuator being moved to a second position, triggering said alarm unit in response to tensioning of said actuator cable caused by movement of said protective cover relative to said vehicle;
   wherein the step of providing said protective cover includes providing at least one pocket on a surface of said protective cover, and wherein the step of removably affixing said alarm unit to said protective cover includes inserting said alarm unit into said pocket;
   wherein the step of arming said alarm unit includes inserting a first end of an actuator cable into said pocket through an aperture in said pocket, removably coupling said first end of said actuator cable to said actuator of said alarm unit, and removably coupling a second end of said actuator cable to said vehicle with said actuator cable between said alarm unit and said vehicle untensioned.

22. The method of claim 21, wherein the step of arming said alarm unit includes use of a remote control to send a remote signal to said alarm unit for arming said alarm unit.

23. A vehicle protective cover and security system for a vehicle, said vehicle protective cover and security system comprising:
   a flexible protective cover having an inner surface and an outer surface, said protective cover adapted to cover substantially all portions of the vehicle when said protective cover is deployed on the vehicle;
   at least one pocket on said inner surface of said protective cover, said pocket defined by a top portion, a bottom portion, and first and second side wall portions, said pocket having a aperture in one of said portions;
   at least one self-contained alarm unit, said alarm unit removably contained within said pocket, said alarm unit including a transducer, an alarm circuit for driving said transducer, an actuator for activating said alarm circuit, and a battery for providing power to at least said alarm circuit; and
   at least one actuator cable having a first end extending into said pocket through said aperture and removably coupled to said actuator and a second end adapted to be removably coupled to said vehicle for operating said actuator to activate the alarm circuit in response to movement of said protective cover relative to said vehicle when said protective cover is deployed on said vehicle.

24. The vehicle protective cover and security system of claim 23, wherein said pocket includes a top portion defining an opening for said pocket to allow said alarm unit to be inserted into said pocket, said top portion adapted to securely close said opening for maintaining said alarm unit in said pocket.

25. The vehicle protective cover and security system of claim 24, wherein said aperture is located in a lower corner of said pocket.

26. The vehicle protective cover and security system of claim 23, wherein said alarm circuit includes a reset circuit.

27. The vehicle protective cover and security system of claim 26, wherein said reset circuit includes a timer, said timer adapted to deactivate said alarm circuit after a preset interval of time.

28. The vehicle protective cover and security system of claim 23, wherein said alarm unit includes a transponder allowing remote arming of said alarm unit.

* * * * *